United States Patent [19]
Hartikainen et al.

[11] Patent Number: 6,003,031
[45] Date of Patent: Dec. 14, 1999

[54] METHOD AND SYSTEM OF PROVIDING SUBSCRIBER-SPECIFIED SERVICE BY AN INTELLIGENT NETWORK

[75] Inventors: Eeva Hartikainen, Helsinki; Asko Suorsa, Vantaa; Leena Sivola, Espoo, all of Finland

[73] Assignee: Nokia Telecommunications Oy, Espoo, Finland

[21] Appl. No.: 08/930,870

[22] PCT Filed: Apr. 2, 1996

[86] PCT No.: PCT/FI96/00180

§ 371 Date: Oct. 6, 1997

§ 102(e) Date: Oct. 6, 1997

[87] PCT Pub. No.: WO96/31987

PCT Pub. Date: Oct. 10, 1996

[30] Foreign Application Priority Data

Apr. 4, 1995 [FI] Finland ..................... 951602

[51] Int. Cl.[6] .................................. G06F 17/30
[52] U.S. Cl. ................. 707/10; 707/1; 379/201; 379/211; 379/220
[58] Field of Search ............ 707/1, 10; 379/34, 379/112, 113, 114, 115, 201, 207, 211, 220; 370/201, 207, 220

[56] References Cited

U.S. PATENT DOCUMENTS

| | | | |
|---|---|---|---|
| 5,377,186 | 12/1994 | Wegner et al. | 370/220 |
| 5,379,383 | 1/1995 | Yunoki | 709/203 |
| 5,515,427 | 5/1996 | Carlsen | 379/220 |
| 5,517,562 | 5/1996 | McConnell | 379/207 |
| 5,581,610 | 12/1996 | Hooshaiari | 379/133 |
| 5,732,130 | 3/1998 | Iapaluci | 379/207 |
| 5,793,839 | 8/1998 | Farris | 37/39 |
| 5,793,852 | 8/1998 | Kang | 379/115 |
| 5,854,835 | 12/1998 | Montgomery | 379/113 |

FOREIGN PATENT DOCUMENTS

| | | |
|---|---|---|
| 92/11603 | 7/1992 | WIPO . |
| 92/11724 | 7/1992 | WIPO . |
| 93/25035 | 12/1993 | WIPO . |
| 94/05111 | 3/1994 | WIPO . |
| 651 548 | 5/1995 | WIPO . |

*Primary Examiner*—Thomas G. Black
*Assistant Examiner*—Diane Mizrahi
*Attorney, Agent, or Firm*—Pillsbury Madison & Sutro, LLP

[57] ABSTRACT

The invention relates to a method of providing a subscriber-specific service by an intelligent network. In the method, a service logic program is stored in a database (BD1, DB2) of the intelligent network and a subscriber-specific service is provided by starting said service logic program in response to a predefined trigger condition. In order that subscriber-specific services could be implemented economically on a really large scale, (a) the service logic program is implemented as a service logic program (400) common to a plurality of subscribers, (b) subscriber-specific information relating to the service is stored, for each subscriber, separately from said service logic program, and (c) in the service logic program there are defined points from which the program reads, during the execution, subscriber-specific information on an individual subscriber, whereby the execution of the common service logic program with the read subscriber-specific information provides said subscriber-specific service.

9 Claims, 4 Drawing Sheets

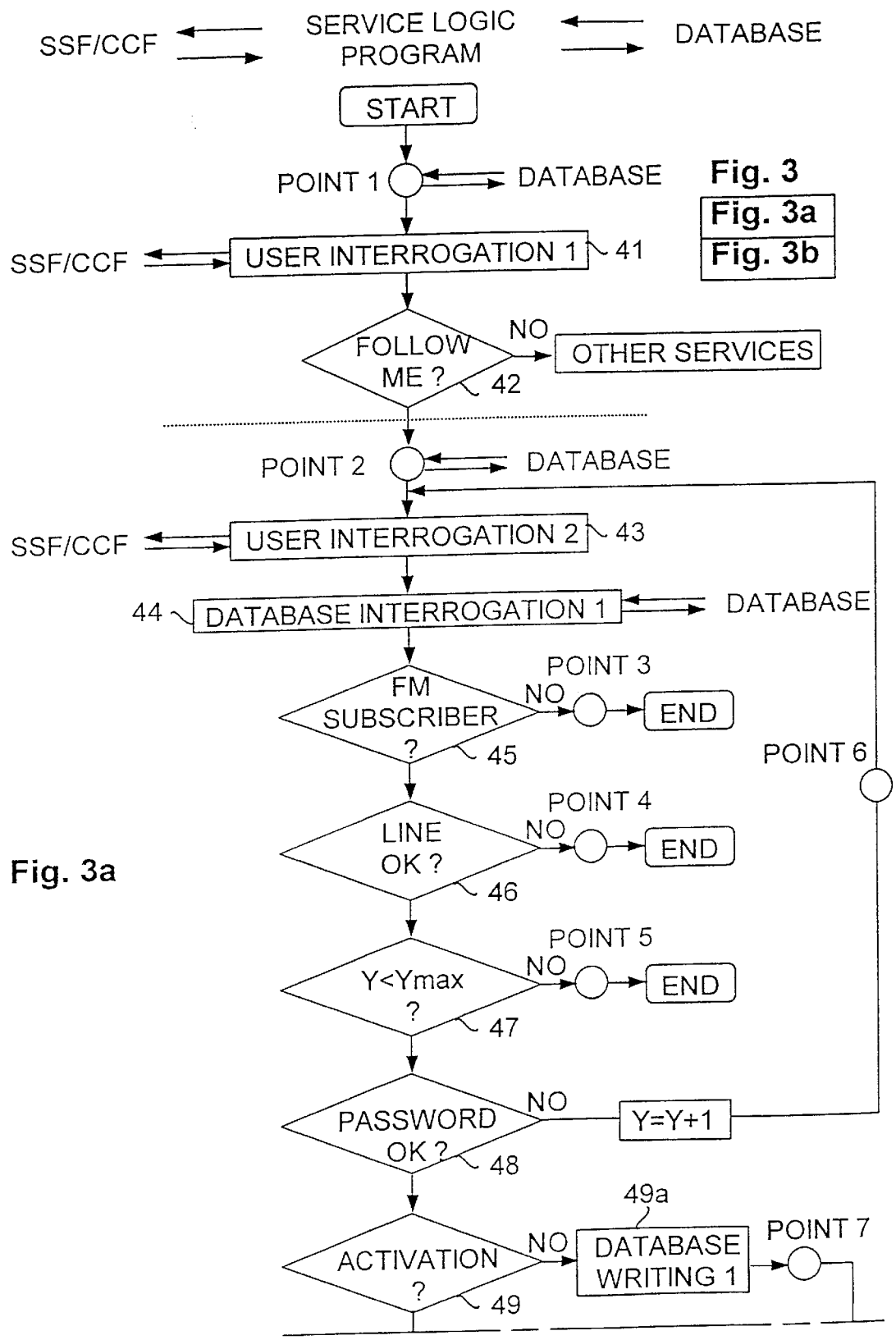

METHOD AND SYSTEM OF PROVIDING SUBSCRIBER-SPECIFIED SERVICE BY AN INTELLIGENT NETWORK

This application is the national phase of international application PCT/FI96/00180, filed Apr. 2, 1996 which designated the U.S.

FIELD OF THE INVENTION

The invention relates to a method of providing subscriber-specific service by an intelligent network the and a system according for providing a subscriber-specific service by using an intelligent network.

BACKGROUND OF THE INVENTION

In order to make it easier to understand the following description, we shall first define some of the terms used below.

A customer and a subscriber refer to a person or community that buys and uses an intelligent network service.

An operator refers to a person or community that creates a service meeting the requirements set by the customer or subscriber.

A manufacturer refers to a person or community that manufactures the equipment and software with which the operator creates an intelligent network service.

Fast developments in telecommunications have enabled operators to provide various services for users. Network architecture offering advanced services is called an intelligent network, generally abbreviated as IN. IN architecture can be applied to most telecommunication networks, such as Public Switched Telephone Networks (PSNT), mobile communication networks, Packet Switched Public Data Networks (PSPDN), Integrated Services Digital Networks (ISDN) and Broadband Integrated Services Digital Networks (B-ISDN). Irrespective of network technology, the object of IN architecture is to facilitate creation, control and management of new teleservices. With regard to present IN specifications, reference is made to Advanced Intelligent Network, Release 1 (AIN Rel.1) by Bellcore and Capability Set 1 (CS-1) by CCITT.

IN architecture is illustrated by FIG. 1, in which physical entities are represented by as rectangles or circles, and functional entities, ovals. Signaling connections are indicated by broken lines, and actual transport, which is, e.g., speech, by solid lines. Optional functional entities are indicated by a broken line. The signaling network shown in the figure is a network according to Signaling System No. 7 (SS7, a known signaling system described in the blue book *Specifications of Signaling System No. 7*, Melbourne 1988 of CCITT (now: ITU-T)).

First the architecture in the physical plane of an intelligent network will be described. Subscriber Equipment (SE), such as a phone, computer or telefax, is switched either directly to a Service Switching Point (SSP) or to a Network Access Point (NAP).

The service switching point (SSP) offers the user access to the network and takes care of all the necessary selections. The (SSP) is also able to detect any requests for service in the intelligent network. Operatively, the (SSP) contains call management and service selection functions.

The network access point (NAP) is a conventional exchange (e.g. a DX 220 exchange by the applicant) that contains a Call Control Function (CCF) and is able to distinguish between conventional calls and calls needing the services provided by the intelligent network and to route the latter to the appropriate (SSP).

The Service Control Point (SCP) contains the service logic programs used for providing intelligent network services.

The Service Data Point (SDP) is a database containing data on the customer and network, the data being used by the service logic programs of the SCP to provide individualized services. The SCP can use the services of the SDP either directly or through a signaling network.

An Intelligent Peripheral (IP) provides special-purpose functions, such as announcements and voice and multiple choice detection.

A Service Switching and Control Point (SSCP) comprises an SCP and an SSP in a single node (i.e., if an SSP node shown in the figure comprises both SCF and SDF entities, it is an SSCP).

The functions of a Service Management Point SMP comprise management of the database (SDP), control and testing of the network, and collection of network information. It can be connected to all other physical entities.

A Service Creation Environment Point (SCEP) is used for defining, developing and testing the IN services, and for supplying the services to the SMP.

An Adjunct (AD) corresponds operationally to the service control point (SCP) but is connected directly to an SSP by a high-speed data link (e.g., ISDN 30B+D connection) rather than through the common channel signaling network SS No. 7.

A Service Node (SN) can control IN services and transfer data to and from the users. It communicates directly with one or more SSPs.

A Service Management Access Point (SMAP) is a physical entity that provides certain users with access to the SMP.

To define the function of the different modules in the intelligent network and the restrictions relating to them, the standards (CS-1) also present the intelligent network as a four-plane Intelligent Network Conceptual Model. One layer of the model forms a so-called Distributed Functional Plane DFP, which describes the intelligent network as functional units in accordance with the above CS-1 standard. The following is a description of these functional units, the locations of which are shown in FIG. 1.

The functions relating to call control are SSF, SRF, CCF and CCAF.

A Service Switching Function (SSF) interconnects a Call Control Function (CCF) and a Service Control Function (SCF) by allowing the service control function (SCF) to control the call control function (CCF).

A Specialized Resources Function (SRF) provides specialized resources needed for implementing IN services. Examples for these are changes in protocol, speech detection, voice messages, etc.

The call control function (CCF) refers to conventional call and connection establishment. A Call Control Agent Function (CCAF) provides the user with access to the network.

The functions relating to service control are (SCF) and SDF. A Service Control Function SCF comprises the IN service logic and attends to service-bound processing. A Service Data Function (SDF) provides access to service-bound and network information, and allows consistent checking of information. The SDF hides from the SCF the actual implementation of the information and offers the SCF a logical view of the information.

The functions relating to management are a Service Creation Environment Function (SCEF), Service Management Function (SMF) and Service Management Access Function (SMAF). The SMF comprises supervision of management, maintenance and location of the services; the SMAF provides a connection to the SMF; and the SCEF makes it possible to define, develop and test IN services and supply them to the SMF.

A request for service made by, a calling party typically comprises an act of picking up the receiver and/or a certain series of numbers. The call control function (CCF) has no service information, but it is programmed to identify the requests for service. The CCF interrupts the call set-up for a moment and informs the service switching function (SSF) of the state of the call. The function of the SSF is to interpret the request for service and the information on the state of the call, to form a standardized request for service and to send the request to the SCF. The SCF receives the request and decodes it. After this, it forms, encodes and sends a standardized response to the SSF. The formation of a response may comprise encoding of complicated service logic, starting of a Prompt and Collect Sequence, or a request to different SDFs. The SSF decodes and interprets the response sent by the SCF. It then gives the CCF accurate instructions for performing the preparation process. In accordance with the IN standard CS-1, the call control function (CCF) always bears full responsibility for the condition and control of local links.

When a response is sent to an SSF, the service control function (SCF) may have to participate in a conversation between a calling user and an end user. This normally takes place in the form of the above prompt and collect sequence, which the SCF authorizes the SRF to perform. Typically, the SCF instructs the SSF to connect the calling user or end user to a suitable physical source by using the SRF. The source may be e.g. a voice message system. The SCF instructs the SRF in the required prompt and collect sequence and subsequently temporarily 'freezes' the call processing. The SRF activates the prompt and collect sequence and participates in the conversation between the calling user and the end user. The response, which may be, e.g., an individual ID number, is encoded and returned to the SCF, and the voice connection with the SRF is terminated. After this, the SCF continues its service control sequence.

The above is a brief description of an intelligent network offering services implemented in accordance with the present invention. For more specific details, see, e.g., the ITU-T recommendations Q.121X or the Bellcore recommendations AIN.

An intelligent network can offer a large number of different services. The services include, e.g., freephone and Account Card Calling (ACC), which means that the user can phone from any phone to any number by inserting the number and PIN of his credit card before he inserts the telephone number. A graphical user interface for creating IN services is presented in patent application WO 92/11603. In the method of the document, a program record containing desired characteristics is customized separately for each customer, and the record is stored in a database located in the SCP so that it can be called to direct the call when the SSP announces that a predefined trigger condition is met. A situation like this where control of the SCP is required may be, e.g., a call destined to or dialed from a specific number. A program record comprises primitives (basic units of a program), which in a graphical user interface are represented by nodes. The operator determines the relations between the primitives by lines connecting the nodes. Each separate graph consisting of nodes and lines connecting them corresponds to a separate program record stored in the database. Problems in this known method are a need for a graphical user interface and the high costs involved in the solution. A subscriber-specific service cannot be created without expensive special equipment and programs by which the graphical representation of the service is converted into a code executed through an intermediate step and stored in the database. Further, even if two subscribers buy the same service, a separate program record will have to be created for each subscriber. This increases the need for capacity in the database and the work load of the operator.

An improvement to the above method is presented in patent application WO 94/05111, which introduces the concept of a service template. The operator or manufacturer can design a template for the best selling services. When a customer subscribes to a service, the operator creates the service by loading a service according to the template to the display of a graphical user interface and by making such customer-specific additions or modifications to the service that are necessary for creating the service requested by the customer. The service customized in this manner is then converted into a code to be executed and stored in the database of the (SCP). Although in the method the operator need not create a service logic program for each customer 'starting from scratch', a separate code-containing program record will have to be created for each customer and stored in the database. The other drawbacks of the earlier method also remain unsolved.

SUMMARY OF THE INVENTION

The object of the present invention is to obviate the above drawbacks by providing a solution that makes it possible to implement customer-specific IN services economically on a large scale. The object is achieved by a method and system of providing subscriber-specific service by an intelligent network.

In the present invention a customer- or operator-specific service logic program is divided into two: a general service-specific part and operator- or customer-specific parameters. It is then possible for the operator to create a customer-specific service simply by changing or adding customer-specific parameters, e.g., by a man-machine language (MML) command. The general service-specific part (program code) may be created by the manufacturer or the operator, and it is preferably the same for each customer that has subscribed to the service concerned, since the services are customized customer-specifically simply by modifying the customer-specific parameters. The functionality of the service can thus be modified to be customer- or operator-specific without changing the actual program code at all. No changes are thus necessary in the program code, and yet the customer experiences the service as personal service implemented only for him.

The present invention makes it possible for the operator to implement IN services on a large scale without it being necessary to acquire expensive equipment and software.

Since the operator may use the invention to create different variations of the same service for its own operation, the method does not relate solely to production of customer- or subscriber-specific services, but the operator may also create different variations for its own internal use only, as in a method of producing customized service by an intelligent network.

BRIEF DESCRIPTION OF THE DRAWINGS

In the following, the invention and its preferred embodiments will be described in greater detail with reference to the examples of the attached drawings, in which.

DETAILED DESCRIPTION OF THE CURRENTLY PREFERRED EMBODIMENTS OF THE INVENTION

In the following description of the method of the invention, implementation of a "Follow Me" service will be used as an example. A Follow Me service is a service similar to conventional call forwarding, enabling the customer to redirect the calls addressed to his access point to any other access point (destination access point) of the telephone network. A conventional call forwarding procedure can be activated only from the subscriber's own access point. The activation is performed by picking up the receiver and dialing a predefined code that activates the call forwarding procedure, e.g., by dialing *21*XXXXXX#, where XXXXXX is the telephone number of the destination. A Follow Me service implemented by IN architecture, in turn, can be triggered from any access point whatsoever by making a call to a predefined directory number (e.g., 9800-2121) reserved for activation and passivation of IN services. The dialing of the number triggers the CCF/SSF to send a message to the SCF responsible for the activation and passivation of IN services. On the basis of the message the SCF loads the appropriate service logic program from the database for execution.

Figure 1:
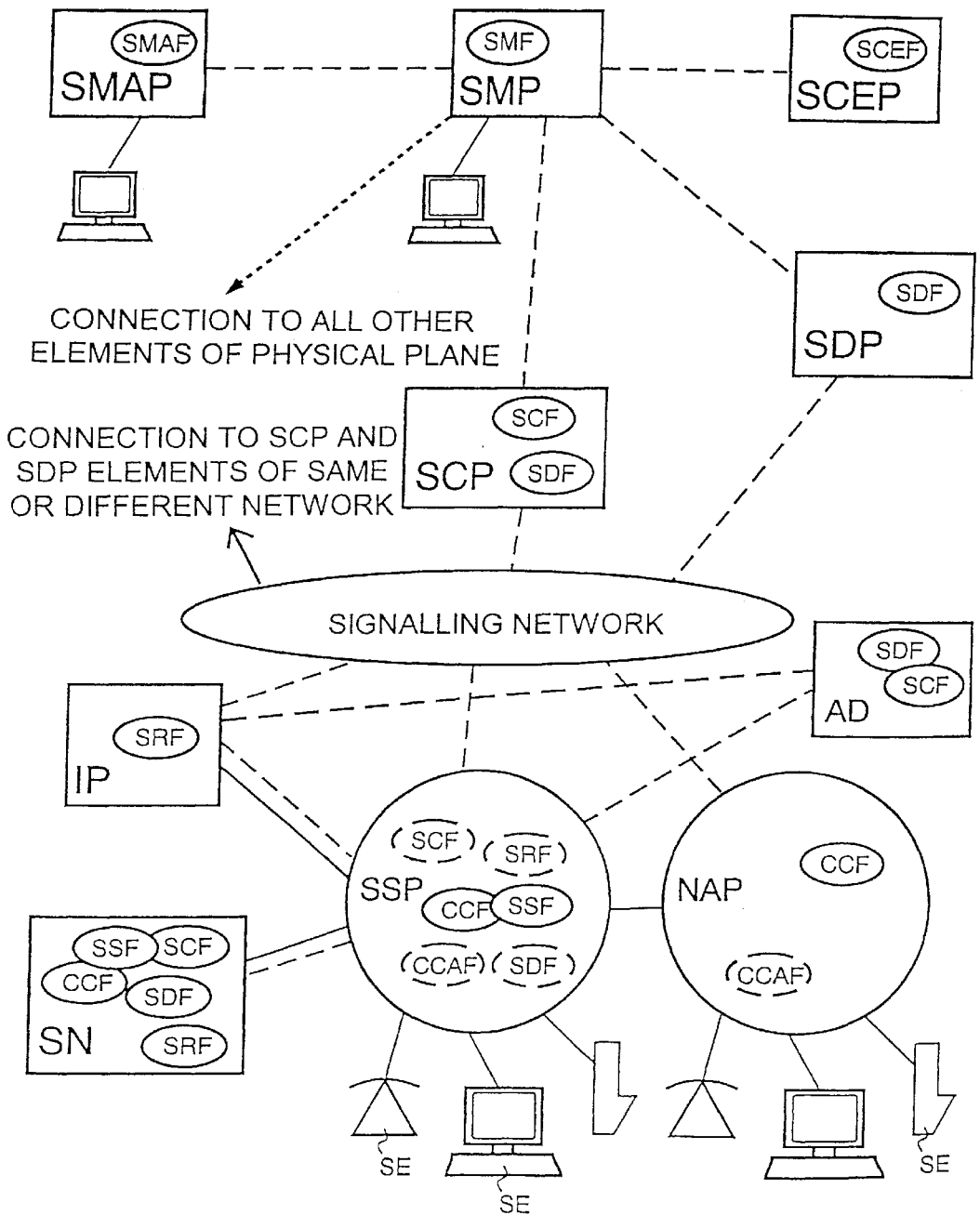
FIG. 1 illustrates IN architecture.
Figure 2:
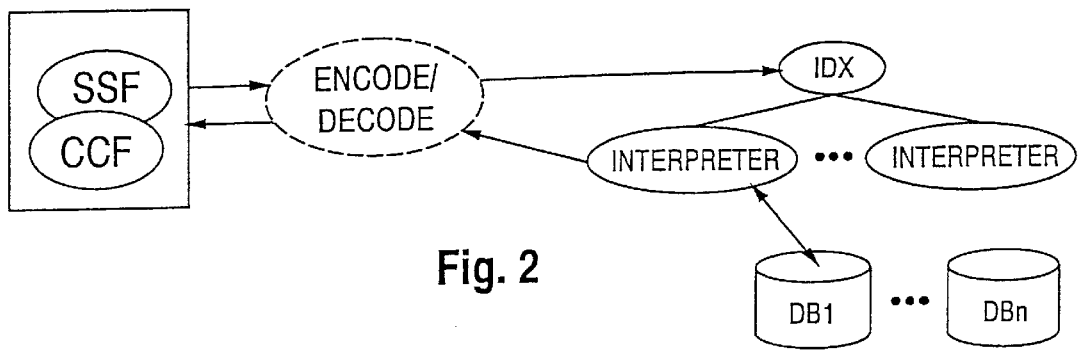
FIG. 2 is a block diagram showing the elements by which the service provided by the invention is triggered, FIG. 3 (divided into FIGS. 3a and 3b) is a flow diagram illustrating implementation of a "Follow Me" service in accordance with the invention.

The correct program to be started is found based on the number dialed by the subscriber, appearing from the message send by the CCF/SSF to the SCF. The following is a more detailed description of the operations performed in connection with the start-up. Reference is made to FIG. 2, which shows the elements by which the program located in the database is started so as to implement a service. First, the SCF receives a message from the CCF/SSF identifying the program to be started. If the CCF/SSF and the SCF are located in different network elements (SSP and SCP), the messages pass through program block ENCODE/DECODE, which modifies the INAP messages according to the recommendations as internal messages intelligible to the programs. [In communicating with each other, the SSP and SCP use the INAP protocol described in ETSI IN CS1 INAP Part 1: Protocol Specification, Draft prETS 30 374-1, November 1993. In the SS7 protocol pile, the INAP layer is the topmost layer, and beneath it are the TCAP layer (Transaction Capabilities Application Part), SCCP layer (Signaling Connection Control Point) and MTP layer (Message Transfer Part).] If, on the other hand, the CCF/SSF and SCF are located in the same network element (which is, e.g., a service node SN, cf,. FIG. 1), no modification (program block ENCODE/DECODE) is needed, but the messages may be internal of the network element. Program block ENCODE/DECODE is, thus, an optional block that modifies the protocol where necessary.

The transmitted message identifying the service logic program is received by program block IDX, which is the block implementing the SCF in the network element. After receiving the message, block IDX duplicates the interpreter program INTERPRETER, and the copy reads a program record to be interpreted from the database (e.g., DB1) (the databases belong to the SDF). After this, the interpreter program INTERPRETER starts to interpret the program command by command. (Storage of a program in code form and its interpretation during the execution are previously known, e.g., from programming language BASIC. The use of a separate interpreter is advantageous, since new versions of the programs of a network element are then easier to put into use (since the interpreter is already there, only updating of program records is needed).

When the interpreter program INTERPRETER has proceeded in the execution of the program to a point where it is necessary to send messages to the CCF/SSF or SRF, INTERPRETER performs the transmission either directly (the message then being internal of the network element) or through program block ENCODE/DECODE (separate SSP and SCP) and waits for a response. After this, intervention of program block IDX is no longer needed but the other party (which is either the CCF/SSF in the service node SN or block ENCODE/DECODE if the SSP and SCP are separate) is from then on able to communicate directly with the appropriate copy of INTERPRETER. Several copies of program block INTERPRETER may exist at the same time, each copy interpreting a separate program. When the INTERPRETER has proceeded in the interpretation of the program to a command that requires cooperation with the SDF, it performs a database operation (e.g., read or write) in a database that is either the same (DB1) as or different (DB2 . . . DBn) from the database that the program record to be interpreter was read from.

Figure 3B:
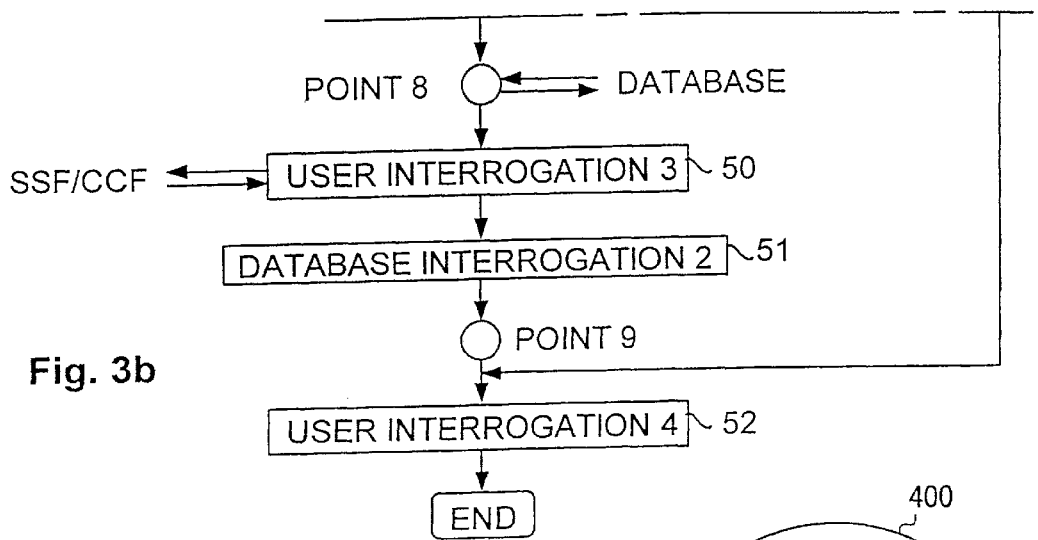

The following is a detailed description of implementation of a Follow Me service according to the invention. Reference is made to the flow diagram of FIGS. 3a and 3b, where the basic units (primitives) of the program are indicated by rectangulars and diamonds and, the units being typically implemented by Service Independent Blocks (SIB) defined in the ITU-T recommendations. The rectangular nodes are facility nodes, and the diamonds are decision (condition) nodes. A facility node corresponds to a part of a program where an operation of a service is performed, e.g., a voice message is read to the subscriber and additional selection information is collected. A decision node, in turn, corresponds to a part of a program where one of several possible alternatives is selected in the execution of the program in accordance with the parameters concerning the call and service. The arrows to and from the left of the flow diagram stand for the conversation carried out by the program with the SSF/CCF (cf. FIG. 2). The arrows to and from the right of the flow diagram, in turn, stand for the read operations executed from the database (e.g., DB1, FIG. 2) and/or write operations executed to the database by the program.

The circle in the flow diagram corresponds to a part of a program in which the subscriber-specific parameters defined in the service logic program for this particular subscriber can be requested from the database. The part of the program represented by the circle will be referred to as a point. In the invention, certain well-defined points are added to the service logic program, and certain functional characteristics can be associated with these points. The points are identified based on an identifier code. The code is a consecutive number within the service logic program, the number being transmitted in connection with certain commands. At a point, the subscriber-specific information to be retrieved can be identified by any identifier identifying the subscriber, e.g., by a subscriber identifier or the subscriber's telephone number.

Immediately after the start-up, the program proceeds to point 1, where it reads from the database a record defined unambiguously on the basis of a service logic program identifier, serial number of the point, service facility and subscriber identity. Since at this stage of the execution of the program, the desired service facility and the subscriber identity are not yet known, the service logic program uses a default value instead, whereby a general record corresponding to the first point of the service logic program is read. In a first embodiment of the invention, the record to be read contains the fields 'announcement parameter', 'clearcode parameter', 'counter parameter' and 'alarm parameter'.

The 'announcement parameter' informs the subscriber of the announcement to be read next. The 'clearcode parameter' indicates the clearcode to be stored if the execution of the program is incorrectly interrupted after this point, but before the next point. The 'counter parameter' indicates the counter the value of which is added by one by the execution of this part of the program. The 'alarm parameter' identifies the alarm that is requested from this part of the program. The record to be read may also comprise other parameters, such as 'time parameter' or 'destination number parameter', or any other variable that influences the execution of the program and can be turned into a parameter.

User interrogation 1 (step 41) following point 1 forms and sends the CCF/SSF a message indicating the announcement parameter that has been read last. Based on this, the CCF/SSF plays the announcement corresponding to the announcement parameter to the subscriber. An announcement may be, for example: 'Please enter a facility code'. When the subscriber wants to activate the Follow Me service, he then keys the appropriate activation code, e.g., *44*, and when he wants to deactivate the Follow Me service, he keys the deactivation code, e.g., *44#. Each service that can be controlled by the subscriber corresponds to a certain predefined code that can be keyed in via the push buttons of the telephone in order to activate or deactivate the service as desired.

The CCF/SSF receives the selection information given by the subscriber and sends a message containing an analysis result back to the service logic program. From the message received, the service logic program reads the service identifier and the mode of use of the service (activation/passivation), and proceeds to study the service identifier (step 42). If the service identifier corresponds to the identifier of the Follow Me service, the execution of the program will be continued in the Follow Me branch (the beginning of which is indicated by a horizontal broken line). If the service identifier corresponds to some other service, the execution of the program will be continued in the branch corresponding to the identifier concerned (shown in block 'other services').

If the service identifier received is an identifier corresponding to the Follow Me service, then the program will proceed to point 2, where the program reads a predefined record from the database, the 'announcement parameter' of the record informing the subscriber of the announcement to be read next.

Point 2 is followed by user interrogation 2 (step 43), in which the service logic program sends the CCF/SSF a message indicating the last-read announcement parameter. Here the announcement made to the subscriber may be, for example: 'You wish to activate the Follow Me service. Please enter password*own directory number*destination number#'. The response given by the subscriber informs the program of the subscriber's password and directory number and of the desired destination number. After receiving the information, the program proceeds to database interrogation 1 (step 44), where it reads from the database the information on the subscriber found on the basis of the subscriber's directory number. The information may contain, for example, information on any additional services subscribed to, the state (active/inactive) of such services, the mode of operation of the subscriber line, and the password set.

After the database interrogation, the program checks (step 45) the subscriber information to see whether the subscriber is authorized to use the Follow Me service. If he has no authorization, the program proceeds to point 3, where it reads (not shown in the figure) the record indicating the announcement to be played next to the subscriber, in other words the record that corresponds to point 3 of the service logic program. After point 3 (after the announcement), the program interrupts the execution prematurely. In a situation when a service logic program is interrupted prematurely, the announcement indicated by the last-read announcement parameter is played to the subscriber.

If the subscriber is authorized to use the Follow Me service, the program checks (step 46) whether the subscriber line is active. If the line is not active, e.g., due to unpaid bills, the program reads the parameters contained in the record defined at point 4 and interrupts the execution prematurely after playing the announcement.

If the subscriber line is active, the program checks (step 47) whether the highest allowed number (Ymax) of service activation/deactivation attempts (Y) has been achieved. If yes, the program reads the parameters contained in the record defined at point 5 and interrupts the execution prematurely after playing the announcement.

If the program allows the subscriber to try and activate/deactivate the service at least once more, the program checks (step 48) whether the password entered by the subscriber is the same as the password read from the database. If not, the program adds the number of failed attempts by one and proceeds through point 6 to user interrogation 2 (step 43), which plays an announcement defined at point 6 to the subscriber, the announcement being, for example: "The directory number entered does not match with the password. Please enter: password*your own directory number*destination number#".

If the password is found correct, the program tests (step 49) whether the procedure concerned is activation or deactivation of service. If it is service deactivation, the program proceeds to database writing 1 (step 49a), which deactivates the service. The program then moves through point 7 to user interrogation 4 (described below). If the procedure is service activation, the program proceeds through point 8 to user interrogation 3 (step 50). In user interrogation 3, a personal announcement indicated at point 8 is read to the subscriber, for example: 'Hello, Mikko Honkanen, what number do you want to transfer your calls to?' In response to user interrogation 3, the program receives the destination number given by the subscriber, and in the database writing step 2 (step 51), the number is stored in the database containing the subscriber information. After the writing, the program proceeds through point 9 to user interrogation 4 (step 52).

User interrogation 4 reads an announcement concerning successful activation/deactivation to the subscriber at point 7 or 9, after which the program stores the information needed for charging and terminates the execution. When the Follow Me service is activated and the subscriber's directory number is called, the CCF/SSF sends the SCF a request for service, in response to which the SCF sends the CCF/SSF the destination number to which the subscriber wants his calls to be routed.

Figure 4:
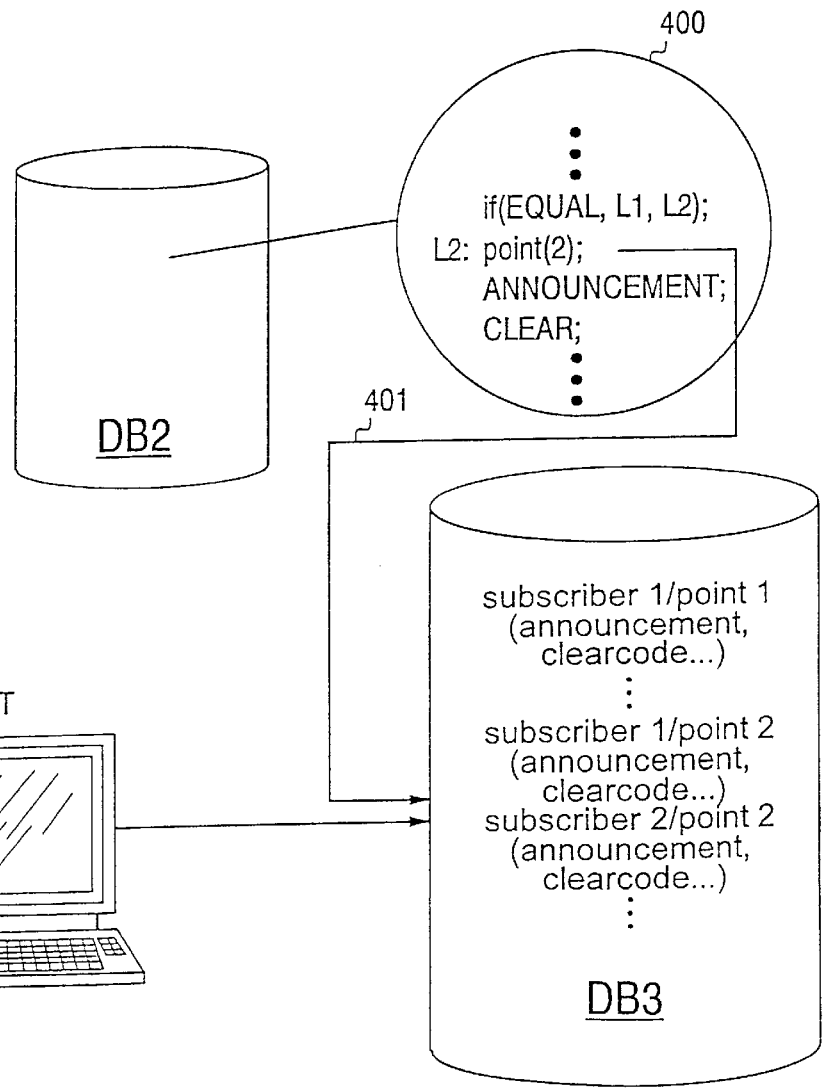
FIG. 4 illustrates the division of a service logic program into two, and customization of a service by an operator in a system according to a first embodiment of the invention.

The present invention makes it possible to implement an IN service such that either the manufacturer or the operator creates, in accordance with the invention, a general service logic program that is common to several subscribers and also creates, in a separate database or table, the subscriber-specific information that the program reads during the execution. FIG. 4 illustrates division of the service logic program into two and the service customization (typically) performed by the operator. A service logic program 400 common to several subscribers is here stored in database DB2 of the network element, FIG. 4 showing a small portion (associated with point 2) of the commands of the program read by the INTERPRETER.

When the program proceeds to point 2 (point (2); the service logic program code shows, at this point, identifier L2, which stands for a jump address), the 'customization information' stored in database DB3 is searched (arrow 401) for information on the subscriber concerned (here subscriber number 2), the information in the figure being an announcement code and a clearcode. The execution of the program is then continued using (where necessary) the codes concerned, i.e., in FIG. 4 the announcement identified by the earlier-read announcement code is used in the announcement command (ANNOUNCEMENT), and when the call has to be cleared (command CLEAR), the clearing method identified by the last-read clearcode is used.

In the example of FIG. 4, the information defining the appearance of the service implemented by a common service code to each reader is stored in database DB3. The information thus defines how the same service appears to each end user (subscriber or operator). The system of the invention thus comprises one service logic program for implementing a certain service and additionally some data, and together they give the impression that each subscriber has his own personal program.

In the above manner, the operator can customize customer- or operator-specific services by deleting, adding or modifying data of separately stored records that influence the execution of the service logic program. The system is made particularly advantageous by the fact that the actual service logic program remains intact, whereby no programming, neither manual nor visual, is needed with a graphical user interface. The subscriber-specific 'customization information' can be changed by the operator, e.g., by command language MML (Man-Machine Language), the I/O syntax of which is defined in the ITU-T (previously CCITT) recommendations Z.317–Z.341. Here, the operator gives MML commands from a data terminal (DT, FIG. 4) located at an exchange or further away, and the commands change the desired parameters of the desired subscriber.

Figure 5:
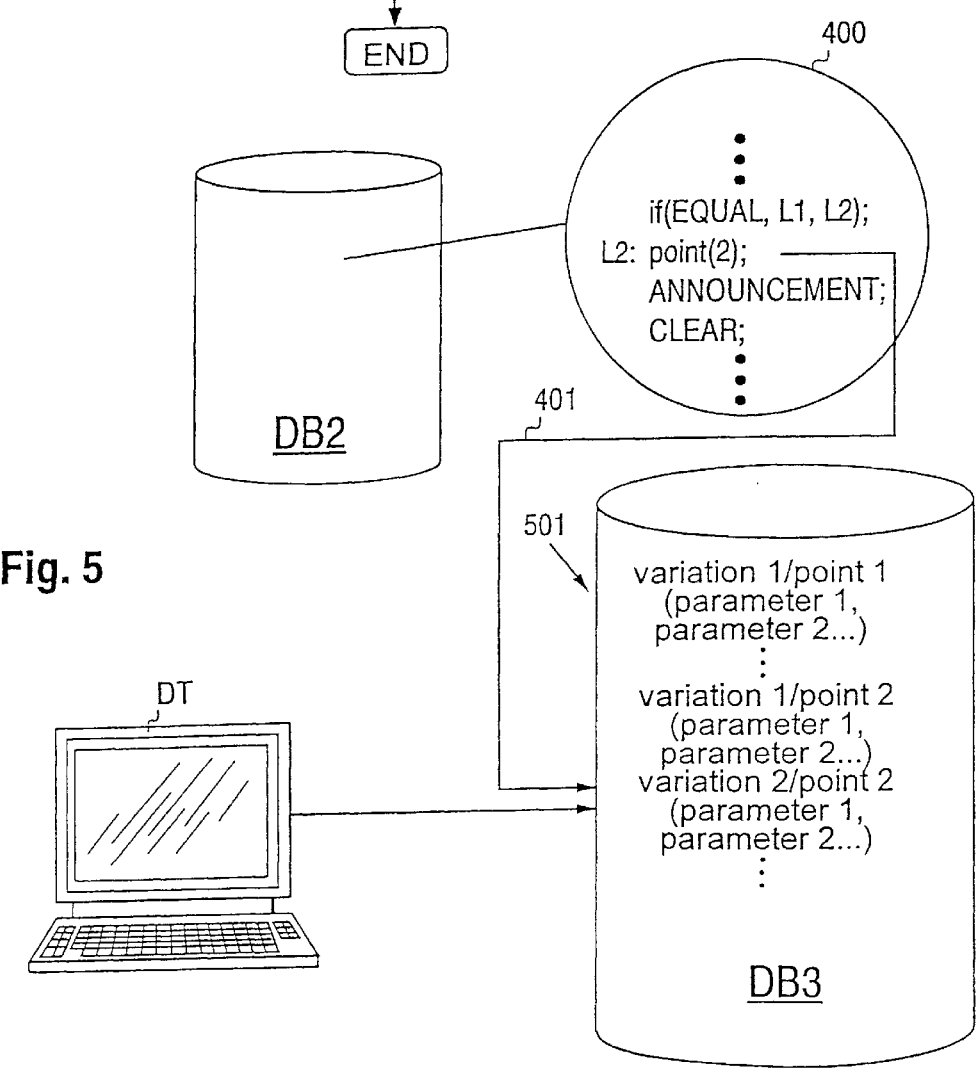
FIG. 5 illustrates a system according to a second embodiment of the invention.

The operator can also use the above principle for internal purposes by creating different variations of the same service by different customization information. The operator can, for example, create variations with different charging methods from the same service by connecting counters to certain points, the counters stepping forward when the execution of the program passes the point concerned. All the information of the actual service logic program stored separately is here information on the operator concerned, the information being divided into different units, each of which is associated with a certain variation of the service concerned. A system according to such an embodiment is illustrated in FIG. 5, which is similar to the system of FIG. 4 with the exception that the customization information 501 stored in database DB3 is here variation-specific information.

The counters associated with points also help the operator to collect various statistics. The operator, for example, may be interested in how many times a program passes through a certain branch, that is, e.g., how many subscribers call within a certain interval using an incorrect Person Identification Number PIN. Instead of a statistical counter, the operator may also connect, e.g., an alarm to a point. The customization information retrieved at a point of the service logic program can here be identified solely on the basis of an identifier and a point of the service logic program, or a service identifier and point.

Although the invention is described above with reference to the examples illustrated in the attached drawings, it is obvious that the invention is not limited thereto but can be modified within the scope of the inventive idea presented above and in the attached claims. The customer- or operator-specific information may even be located in another network element than the general service logic program if they are connected by a sufficiently high-speed link. The only essential feature, however, is that the 'customization information' is stored separately from the actual program code as subscriber-specific information. It should also be noted that, depending on the service, production of a service in the attached claims may mean, e.g., activation/deactivation of a service (as above) or use of a service after the activation.

We claim:

1. A method of providing a subscriber-specific service by an intelligent network, comprising:

storing a service logic program in a database of said intelligent network;

providing said subscriber-specific service by starting said service logic program in response to a predefined trigger condition;

implementing said service logic program as a service logic program common to a plurality of subscriber;

storing subscriber-specific information concerning service for each subscriber of said plurality of subscribers separately from said service logic program; and determining points in said service logic program from which said program reads, during execution of said program, subscriber-specific information for any individual subscriber of said plurality of subscribers, whereby execution of said common service logic program provides subscriber-specific service according to said subscriber-specific information.

2. The method according to claim 1, wherein said service logic program is stored in a different database from said subscriber-specific information.

3. The method according to claim 1, wherein said subscriber-specific information is changed by a man-machine language command.

4. A system of producing a subscriber-specific service by an intelligent network, comprising:

a service logic program stored in a database of said intelligent network, said subscriber-specific service being common to a plurality of subscribers and triggered by a predefined trigger condition;

subscriber-specific information concerning said subscriber-specific service is stored for each subscriber of said plurality of subscribers separately from said service logic program; and in said common service logic program being provided points from which said program reads, during execution of said program, subscriber-specific information for any individual subscriber of said plurality of subscribers, whereby execution of said service logic program provides subscriber-specific service according to said read subscriber-specific information.

5. The system according to claim 4, wherein said service logic program is stored in a different database from said subscriber-specific information.

6. A method of producing a customized service by an intelligent network, comprising:

storing a service logic program in a database of said intelligent network;

producing a customized service by starting said service logic program in response to a predefined trigger condition;

implementing said service logic program as a general service logic program common to a plurality of variations of said customized service;

storing, for each said variation of said customized service, customizing information on said service separately from said service logic program; and defining points in said service logic program from which said program reads, during execution of said program, customizing information for each individual variation of said plurality of variations of said customized service, whereby execution of said service logic program with said read customizing information provides a variation of said service.

7. The method according to claim 6, wherein said service logic program is stored in a different database from said customizing information on said variations.

8. The method according to claim 6, wherein said customizing information is changed by said man-machine command language.

9. A system of producing a customized service by an intelligent network, comprising:

a service logic program stored in a database of said intelligent network, said program being common to a plurality of service variations and started in response to a predefined trigger condition;

for each service variation, customizing information concerning said service is stored separately from said service logic program; and said common service logic program being provided with defined points from which said program read, during execution of said program, customizing information for each individual variation of said service, whereby execution of said service logic program with said read customizing information provides a variation of said service.

* * * * *